(12) United States Patent
Aksoy et al.

(10) Patent No.: US 9,688,100 B2
(45) Date of Patent: Jun. 27, 2017

(54) TIRE CORD FABRIC

(71) Applicant: KORDSA GLOBAL ENDÜSTRIYEL IPLIK VE KORD BEZI SANAYI VE TICARET ANONIM SIRKETI, Kocaeli (TR)

(72) Inventors: Kursat Aksoy, Kocaeli (TR); Sadettin Fidan, Garbsen (DE)

(73) Assignee: KORDSA GLOBAL ENDÜSTRIYEL IPLIK VE KORD BEZI SANAYI VE TICARET ANONIM SIRKETI, Kocaeli (TR)

( * ) Notice: Subject to any disclaimer, the term of this patent is extended or adjusted under 35 U.S.C. 154(b) by 0 days.

(21) Appl. No.: 14/436,929

(22) PCT Filed: Oct. 11, 2013

(86) PCT No.: PCT/IB2013/002294
§ 371 (c)(1),
(2) Date: Apr. 20, 2015

(87) PCT Pub. No.: WO2014/060822
PCT Pub. Date: Apr. 24, 2014

(65) Prior Publication Data
US 2015/0283858 A1    Oct. 8, 2015

(30) Foreign Application Priority Data
Oct. 18, 2012  (TR) ............... a 2012 12030

(51) Int. Cl.
| | |
|---|---|
| B60C 9/22 | (2006.01) |
| B60C 9/00 | (2006.01) |
| B60C 9/11 | (2006.01) |
| B60C 1/00 | (2006.01) |
| D03D 1/02 | (2006.01) |
| D03D 3/00 | (2006.01) |

(Continued)

(52) U.S. Cl.
CPC .............. B60C 9/0042 (2013.01); B60C 1/00 (2013.01); B60C 9/11 (2013.01); B60C 9/22 (2013.01);
(Continued)

(58) Field of Classification Search
CPC . B60C 9/0042; B60C 9/22; B60C 2009/0092; B60C 2009/0466;
(Continued)

(56) References Cited

U.S. PATENT DOCUMENTS 4,739,814 A * 4/1988 Berczi ................... B60C 9/2009
152/527
5,396,941 A * 3/1995 Iuchi ..................... B60C 9/2204
152/527

(Continued)

FOREIGN PATENT DOCUMENTS

| EP | 1491365 | 12/2004 |
| EP | 1731333 | 12/2006 |

(Continued)

OTHER PUBLICATIONS

International Search Report for PCT/IB2013/002294, Completed by the European Patent Office on Mar. 28, 2014, All together 4 Pages.

*Primary Examiner* — Michael H Wilson
*Assistant Examiner* — Philip N Schwartz
(74) *Attorney, Agent, or Firm* — Brooks Kushman P.C.

(57) ABSTRACT

A tire cord fabric having paired cords used as warps. The fabric is suitable for use in pneumatic tires as carcass and cap ply reinforcement, enabling the use of less rubber and higher cord content in a specified cord-rubber composite volume.

6 Claims, 6 Drawing Sheets

(51) Int. Cl.
*D03D 15/00* (2006.01)
*B60C 9/02* (2006.01)
*B60C 9/18* (2006.01)

(52) U.S. Cl.
CPC ............ *B60C 9/2204* (2013.04); *D03D 1/02* (2013.01); *D03D 3/005* (2013.01); *D03D 15/0027* (2013.01); *B60C 2001/0083* (2013.04); *B60C 2009/0035* (2013.04); *B60C 2009/0092* (2013.04); *B60C 2009/1814* (2013.04); *B60C 2009/2285* (2013.04); *D10B 2201/24* (2013.01); *D10B 2331/02* (2013.01); *D10B 2331/021* (2013.01); *D10B 2331/04* (2013.01)

(58) Field of Classification Search
CPC .... B60C 2009/1814; B60C 2009/2096; B60C 2009/0035; B60C 2009/2285; B60C 2009/2271; B60C 1/00; B60C 1/0041; B60C 2001/0083

USPC ................................ 152/451, 527, 556, 531
See application file for complete search history.

(56) References Cited

U.S. PATENT DOCUMENTS

| | | | |
|---|---|---|---|
| 5,827,381 A * | 10/1998 | Miyazono | ................. B60C 9/00 152/451 |
| 6,959,534 B2 | 11/2005 | Westgate et al. | |
| 2003/0034107 A1* | 2/2003 | Westgate | ................. D02G 3/48 152/527 |

FOREIGN PATENT DOCUMENTS

| | | |
|---|---|---|
| FR | 568042 | 3/1924 |
| GB | 243705 | 11/1925 |

* cited by examiner (a) (b)

(a)           (b)

(a) (b)

(a) (b)

TIRE CORD FABRIC

CROSS-REFERENCE TO RELATED APPLICATION

This application is the U.S. national phase of PCT Application No. PCT/IB2013/002294 filed on Oct. 11, 2013, which claims priority to Turkish Application No. 2012/12030 filed on Oct. 18, 2012, the disclosures of which are incorporated in their entirety by reference herein.

FIELD OF THE INVENTION

The present invention relates to a tire cord fabric wherein the paired cords are used as the warp and the use of the said fabric in pneumatic tires as carcass and cap ply reinforcement.

BACKGROUND OF THE INVENTION

In pneumatic tires, the cord reinforcements used as the carcass and the cap ply has twisted structures and circular cross-sections (FIG. 1). The twist directions of yarns and cords are expressed with letters S and Z. When the twisted yarn or cord is in vertical position, if the spiral bendings around the central axis is parallel to the middle portion of the letter S, it is defined as S twisted (S-like twist); if it is parallel to the middle portion of the letter Z, it is defined as Z twisted (Z-like twist).

In a rubberized (calendered) tire cord fabric, there are additional rubber layers on the top and bottom sides of the cords in order to provide required tire performance. On the other hand, rubber matrix causes heat buildup and rolling resistance under dynamic conditions because of its viscoelastic behavior.

The ply thickness is calculated according to a cord diameter having required breaking strength for a given ply strength and optimized number of cords per unit length (epdm). In order to decrease the rubber and tire weight, the ply thickness should be decreased. With this purpose, the cord diameter can be reduced by increasing the epdm (cord count) without changing the unit ply strength. But the increase in epdm means also a reduction in spacing between the cords which may cause poor bending and compression fatigue resistance in tire. For this reason, it is a very limited possibility to increase epdm without sacrificing tire durability.

According to U.S. Pat. No. 6,959,534 of Goodyear, in order to reduce twisting cost, the tire cords having lower ply twists than that of cable twists have already been used in tire industry as reinforcement. According to the said patent, the dipped/heat-set and calendered cords are difficult to process due to their residual torques, caused by the unbalanced ply and cable twists. The residual torques result in the tip rise and curlings in the dipped, and rubberized cord fabrics. For this reason, the cords having S and Z twists are placed alternately in the fabric, in the said Goodyear patent application, instead of conventional tire cord fabric made of fully S twisted cords.

In the application, it is stated, when the cords having unbalanced S and Z twists used alternately in the cord fabric, the torques formed in dipped and calendered cord fabric in S and Z direction would neutralize each other and eliminate the process problems. However, the said patent does not mention the potential superiority of mutual Z and S twisted cords with respect to reduced shear strain between them. Besides the technical advantage which was not mentioned, the unbalanced twisted cords disclosed in the patent have lower breaking strength and modulus compared to the corresponding balanced twisted cords.

The Z and S twisted alternate cord applications can also be seen in some steel cord belts. The objective in the said applications is to eliminate the handling problems (curling) of the calendered steel cord layers.

Patent document numbered GB243705 present in the state of the art related with tire reinforcement fabric having side by side cords (warps) having opposite twist directions. The possible goal could be balancing residual cord torques which may result in tip rise or curling in fabric during processing. Nevertheless, it does not mention the potential advantage of side by side cords with opposite twisting direction in tire performance, especially bending and compression fatigue resistance. The other weak point of this reference document is the lack of the spacing (rivet) between the paired strips. Such fabrics without any rivet do not function in bias or radial tires and results in cord breaks under bending and compression.

Another patent document present in the state of the art EP1491365 has nothing to do with paired cords. In order to obtain a cord, 2 or 3 yarns are twisted in Z direction, and then those twisted yarns are twisted altogether in opposite direction (S direction). RFL treatment, which is mentioned in EP11491365, is already a well known process to obtain adhesion between cord and rubber. However, this document does not mention any alternating twisted side by side cords. Similarly, patent document numbered EP1731333 proposes the same technical solution to the same technical problem; but it does not mention the paired cords.

FR568042, which is another patent document in the state of the art, is related with tire reinforcement fabric having side by side cords (warps) having opposite twist directions. In the specification of this document, the explained goal is balancing residual cord torques. Currently, the textile cords used in tire reinforcement do not show any residual torque influencing processing in a negative way.

SUMMARY

The objective of the present invention is to provide a tire cord fabric having opposite twisted paired cords, namely S and Z twisted cords as pairs.

Another objective of the present invention is to provide a tire cord fabric wherein the reduced shear strain within and between the paired cords under dynamic conditions.

A further objective of the present invention is to provide a tire cord fabric which enables to use less rubber and higher content of cords in a given cord-rubber composite volume (thinner cords).

Yet another objective of the present invention is to provide a tire cord fabric which enables the pneumatic tire to be lighter than the conventional ones.

BRIEF DESCRIPTION OF THE DRAWINGS

"A tire cord fabric" developed to fulfill the objectives of the present invention is illustrated in the accompanying figures, in which.

(b) is the side view and top sectional view of the single paired cord having similar twists.

Figure 3:
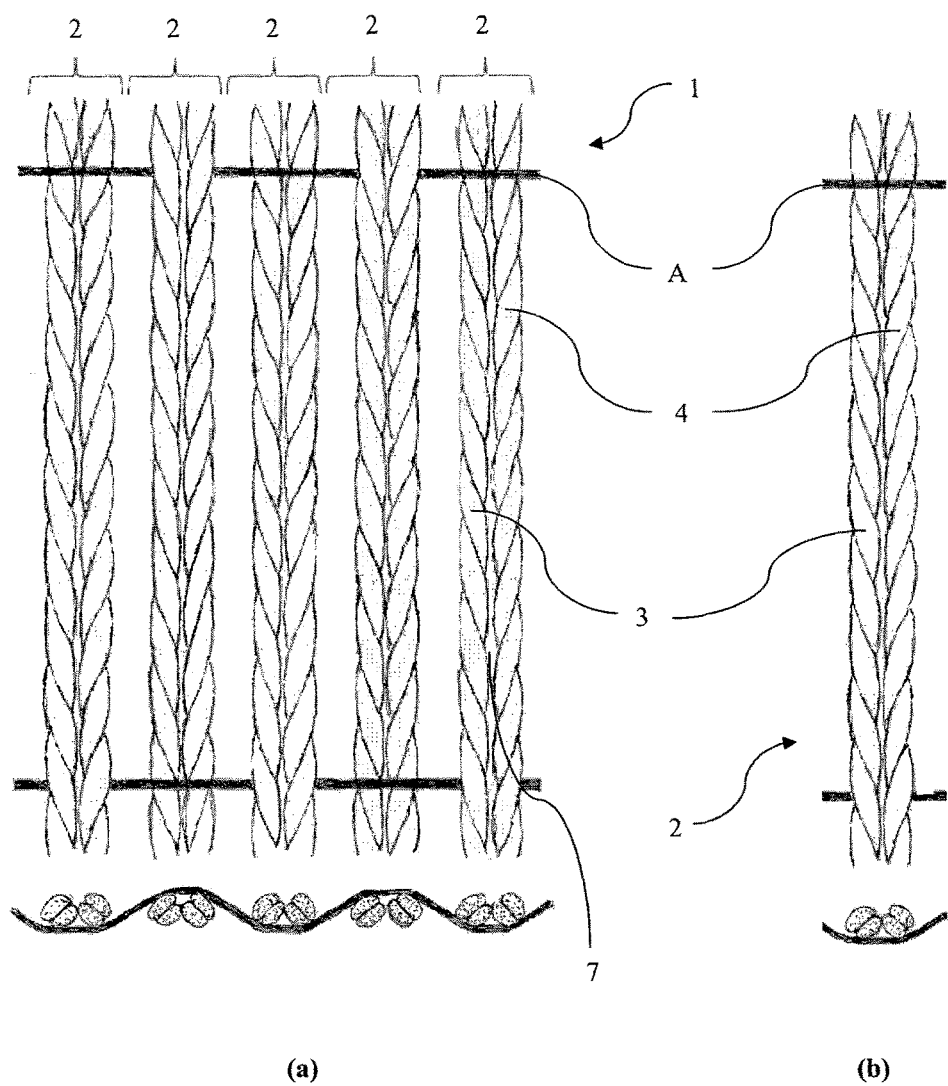

FIG. 3 (a) is the side view and top sectional view of the tire cord fabric having paired cords with opposite twists.

(b) is the side view and top sectional view of the single paired cord having opposite twists.

Figure 4:
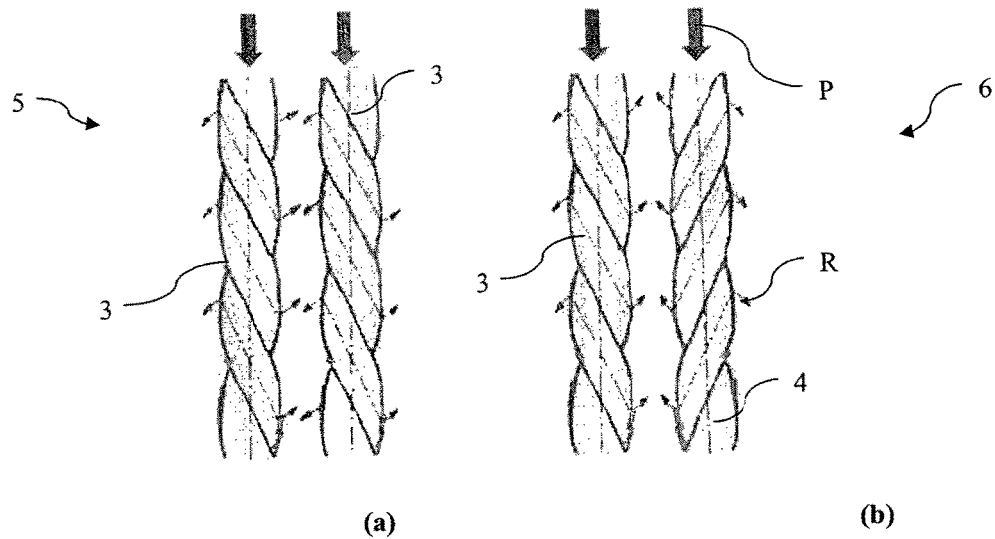

FIG. 4 (a) is the view of the angular movements of the similar twisted cords under compression.

(b) is the view of the angular movements of the opposite twisted cords under compression.

Figure 5:
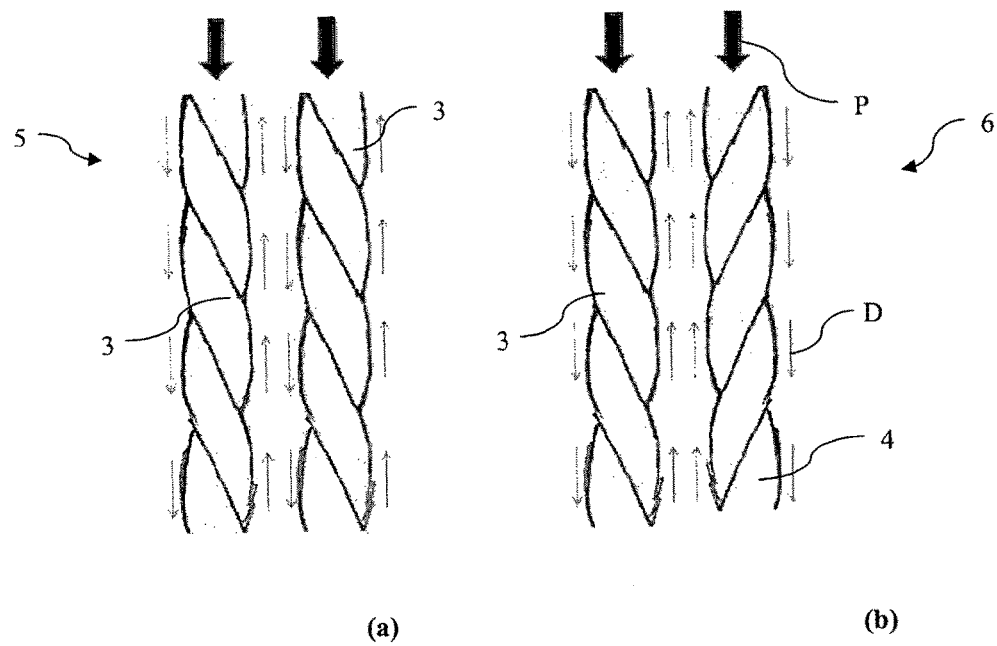

FIG. 5 (a) is the view of the surface strain directions of the similar twisted cords under compression.

(b) is the view of the surface strain directions of the opposite twisted cords under compression.

Figure 6:
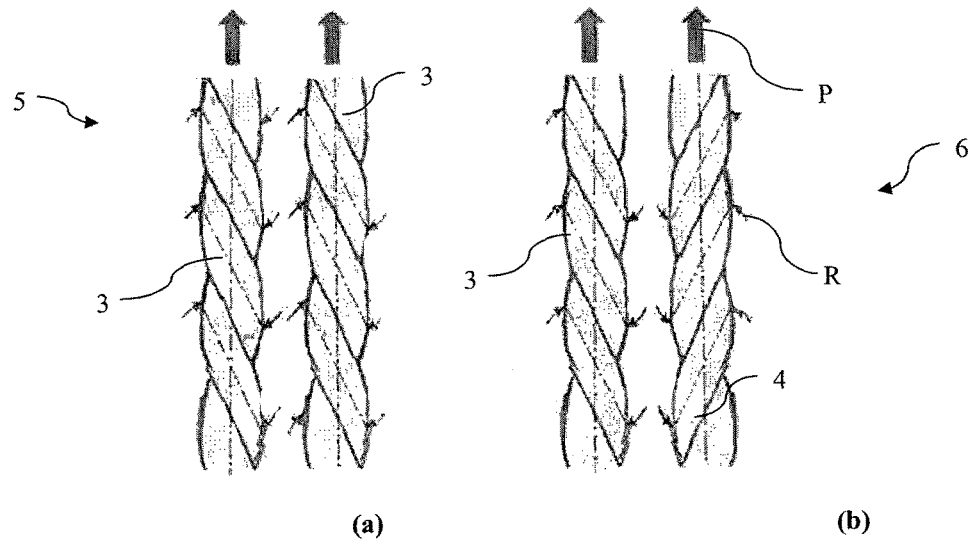

FIG. 6 (a) is the view of the angular movements of the similar twisted cords under tension.

(b) is the view of the angular movements of the opposite twisted cords under compression.

Figure 7:
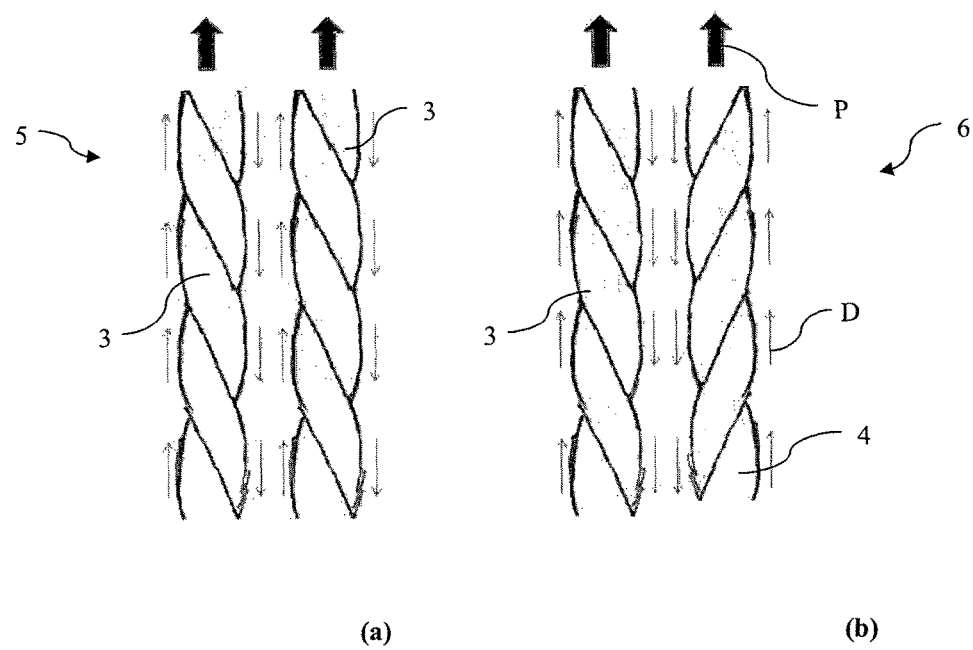

FIG. 7 (a) is the view of the surface strain directions of the similar twisted cords under tension.

(b) is the view of the surface strain directions of the opposite twisted cords under compression.

Figure 8:
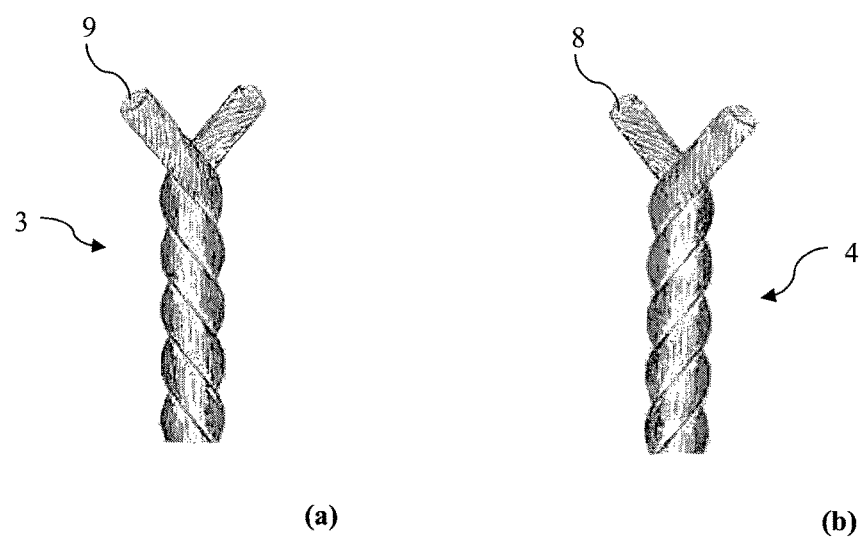

FIG. 8 (a) is the view of the cord structure having Z yarn twist/S cord twist.

(b) is the view of the cord structure having S yarn twist/Z cord twist.

The components given in the figures are numbered and the numbers refer to the following:

1. Tire cord fabric
2. Paired cord
3. S twisted cord
4. Z twisted cord
5. Similar twisted cord pair
6. Opposite twisted cord pair
7. RFL adhesive
8. S twisted yarn
9. Z twisted yarn
A. Weft yarns
O. Prior art
P. Tensile or compressive force
R. Angular movement direction of the cords
D. Cord surface movement direction

DETAILED DESCRIPTION

The tire cord fabric (1) according to the invention enables using less rubber and higher cord content in a given cord-rubber composite volume, and it can be used in vehicle tires as reinforcement by using the paired cords (2) connected to each other as warps.

Figure 1:
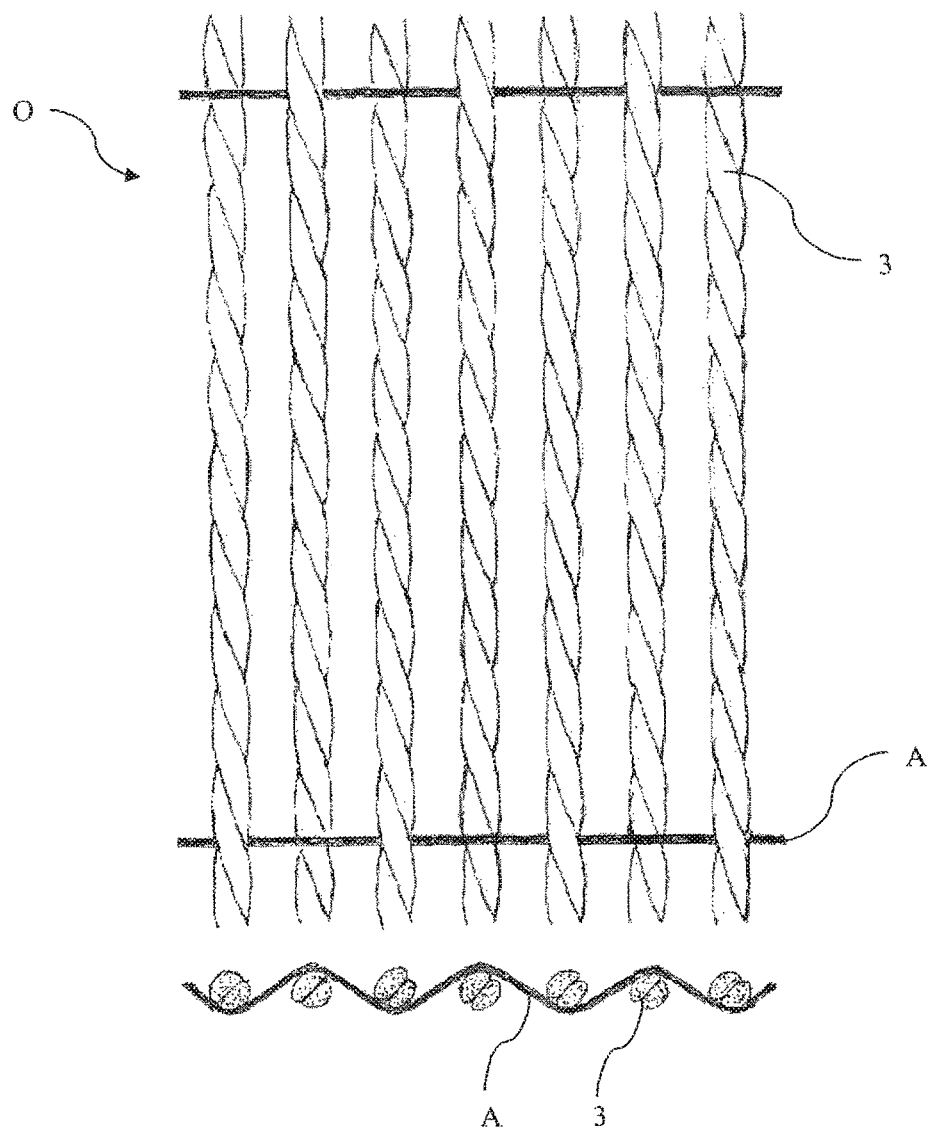
FIG. 1 is the side view and top sectional view of the previous art.
Figure 2:
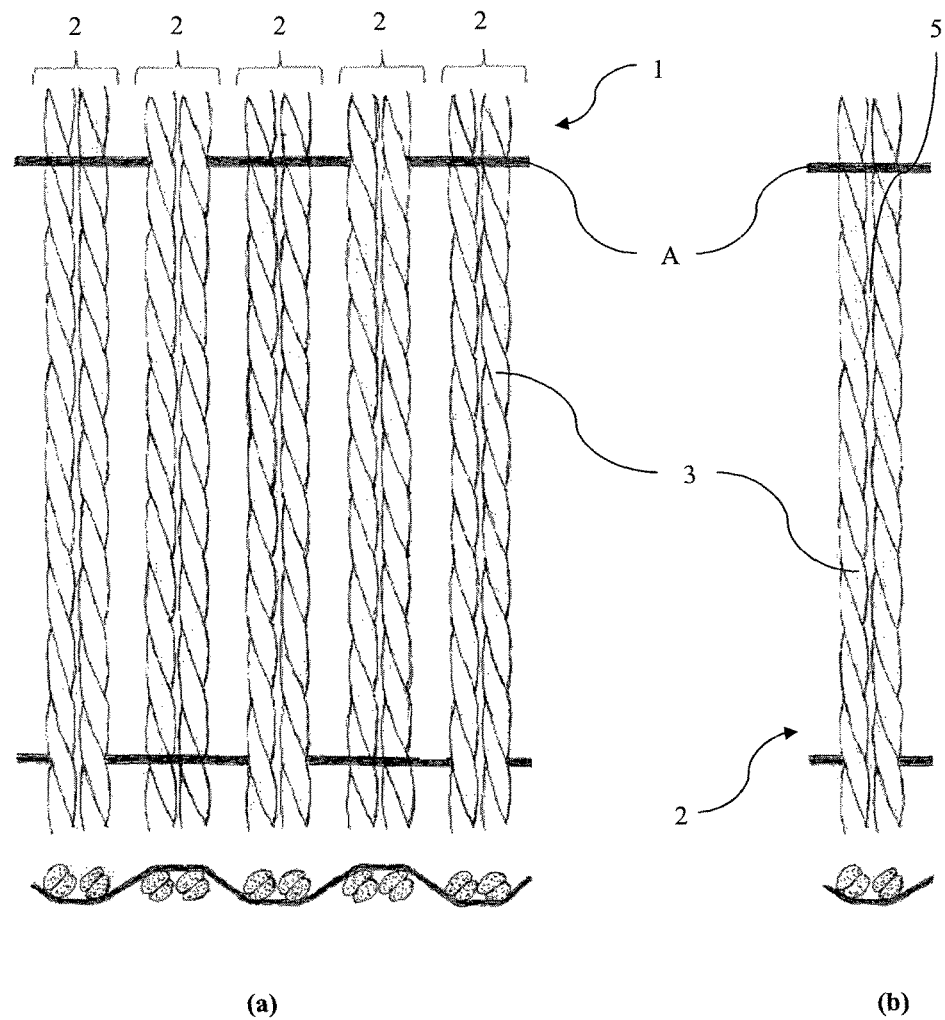
FIG. 2 (a) is the side view and top sectional view of the tire cord fabric having paired cords with similar twists.

The tire cord fabric (1) according to the invention is made of paired cords (2) in order to be used as reinforcement in pneumatic tires. In paired cords (2) which are preferably used, opposite cord twists (6) such as S-Z or Z-S are used (FIGS. 3a and 3b). Furthermore, the paired cords (2) may have similar cord twists (5) such as S-S or Z-Z (FIGS. 2a and 2b).

In the preferred embodiment of the invention, the paired cord (2) structure is made of two cords (6) having opposite cord twists, namely S-Z or Z-S. The shear strain between the mutual faces of the cords (6) having opposite cord twists (SZ or ZS) is less than the conventional SS or ZZ cords (5) (FIGS. 4, 5, 6 and 7).

In the preferred embodiment of the invention, the adhesive (7) filling the spacing between the cords (3, 4) in paired cord (2) is the RFL film layer formed as a result of dipping the paired cord fabric (2) into RFL solution. In fabrics (1), having paired cords (2), each paired cord (two cords) (2) are interconnected to each other with a suitable RFL film. In said paired cord fabric (2) structure, there is a desired spacing between the paired cord (2) strips for rubber penetration in order to provide sufficient rubber adhesion and tire durability.

In cases of tension, compression and bending, the angular shear strain between the faces of SZ or ZS opposite twisted cord (6) type paired cords (3, 4) is less than the conventional applications. Therefore, the suitable cord spacing between the paired cords (2) can be narrower than that of the current tire cord reinforcements (O) having all cords the similar twisting direction (for example S-S twisted cord pairs (5). Besides, in case of mutual contact, SZ or ZS opposite twist cord pairs (6) have surface contact (parallel contact) between the mutual paired cords (2), whereas SS cord (3) or ZZ cord pairs (5) have point contact (cross contact).

In one embodiment of the invention, the paired cords (2) have same balanced twists but they are arranged in opposite directions.

In one embodiment of the invention, the paired cord strips (2) (S-S, Z-Z (5) or S-Z (6) cord twist combinations) contain unbalanced twisted cords applying residual torque to each other. The twists towards each other within the paired cord (2) increase separation resistance and stability in paired cords (2).

If there is an unbalanced twist in a cord, that is yarn (ply) and cord twists are different from each other, the cords try to rotate. The reason for this is the residual torque caused by the difference between the twists. When the difference between the twists increases, the residual torque also increases. If there is no difference between the twists, no residual torque is seen.

In one embodiment of the invention, one of the cords within the paired cord (2) has unbalanced twist applying residual torque towards the other cord, whereas the other cord (the one which does not have residual torque anymore) has balanced twist.

In the preferred embodiment of the invention, the cords used in the paired cord (2) strip is made from a polymeric material selected from a group comprising aramid, rayon, PET, PEN, PA 6.6, PA4.6 or aramid/nylon hybrids.

The linear density of the cords (3, 4) used in the paired cord (2) is between 200 and 10000 dtex. Preferably, the said value may be specifically between 1000 and 5000 dtex, and more specifically 1500 and 4000.

The tire cord fabric (1) according to invention can be used as carcass reinforcement in passenger vehicle and light truck tires.

The tire cord fabric (1) according to invention can be used as cap ply in passenger vehicle tires as annular wound strips with 0 or 5 degrees with the circumferential plane.

In the preferred embodiment of the invention, the width of tire cord fabrics (1) used as cap ply can change between 5 to 25 mm. The said strips can be prepared by cutting from the cord fabric comprising paired cords in predetermined width.

In the preferred embodiment of the invention, the number of the paired cords (2) in 10 cm changes between 25 to 110 (50 to 220 cords/10 cm).

Within the framework of these basic concepts, it is possible to develop a wide variety of embodiments of the tire cord fabrics (1) according to invention. The invention cannot be limited to the examples described herein and it is essentially as defined in the claims.

The invention claimed is:

1. A tire cord fabric for use as cap ply on the top of the belt layers of a passenger vehicle tire as wound strips having a width of 5 to 25 mm with angles of 0 to 5 degrees to the circumferential plane of the tire and which enables using less rubber and higher cord content in a given cord-rubber composite volume and eliminates the disadvantages of an excessive rubber content, comprising:

paired cords used as warps, in which the single cords are connected to each other as pair by RFL adhesive and the number of the paired cords in 10 cm is between 25 and 110 (50 to 220 single cords/10 cm); and SZ or ZS type opposite twisted paired cords having lower angular shear property within and between the paired cords compared to the conventional applications in cases of tension, compression and bending;

wherein the paired cord comprising two cords one of which has unbalanced twist applying residual torque towards the other cord, whereas the other cord therein, having no residual torque, has balanced twist.

2. The tire cord fabric according to claim 1, wherein the said paired cords which are located juxtaposed with the other paired cords have a space between each said paired cords allowing desired rubber penetration there between.

3. The tire cord fabric according to claim 2, wherein formation of RFL film layer the spacing between the said paired cords which fills the said space between said paired cords as a result of dipping the said tire cord fabric with RFL adhesive with an adhesive formed as a RFL film layer by dipping the paired cord fabric into a RFL solution to enable the continuity of the distance between the paired cord strips.

4. The tire cord fabric according to claim 1, wherein the said paired cords comprising at least one cord wherein the said cord has yarn twist in opposite direction of a cord twisting direction.

5. The tire cord fabric according to claim 1, wherein the said paired cords having cords which are manufactured from at least one polymeric material selected from the group comprising aramide, rayon, PET, PEN, PA 6.6, PA 4.6 or aramide/nylon hybrids.

6. The tire cord fabric according to claim 1, wherein the said paired cords having a linear density between 200 and 10000 dtex.

* * * * *